United States Patent
Jiang et al.

(10) Patent No.: US 10,149,333 B2
(45) Date of Patent: Dec. 4, 2018

(54) COMMUNICATION DATA PROCESSING METHOD, APPARATUS, AND SYSTEM

(71) Applicant: Huawei Technologies Co., Ltd., Shenzhen (CN)

(72) Inventors: Ming Jiang, Shanghai (CN); Yang Shen, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/242,133

(22) Filed: Aug. 19, 2016

(65) Prior Publication Data

US 2016/0360560 A1    Dec. 8, 2016

Related U.S. Application Data

(63) Continuation of application No. PCT/CN2014/072404, filed on Feb. 21, 2014.

(51) Int. Cl.
*H04W 76/10* (2018.01)
*H04L 29/08* (2006.01)
(Continued)

(52) U.S. Cl.
CPC .......... *H04W 76/10* (2018.02); *G06F 11/1438* (2013.01); *H04L 67/1097* (2013.01); *H04W 8/30* (2013.01)

(58) Field of Classification Search
CPC ..... H04W 76/02; H04W 8/30; G06F 11/1438; H04L 67/1097
See application file for complete search history.

(56) References Cited

U.S. PATENT DOCUMENTS

2003/0050097 A1    3/2003  Amirijoo et al.
2008/0288498 A1*   11/2008 Hinshaw ........... G06F 17/30575
(Continued)

FOREIGN PATENT DOCUMENTS

CN    1554204 A     12/2004
CN    101242645 A    8/2008
(Continued)

OTHER PUBLICATIONS

IPWireless Inc., On Retaining RRC Context, 3GPP TSG RAN WG2 Meeting #77b, Jeju, Korea, Mar. 26-30, 2012, R2-121550. (Year: 2012).*

*Primary Examiner* — Shailendra Kumar
(74) *Attorney, Agent, or Firm* — Leydig, Voit & Mayer, Ltd.

(57) ABSTRACT

Embodiments of the present invention provide a communication data processing method, an apparatus, and a system. A communication data processing method includes: acquiring, by a processing apparatus, a data distribution policy, where the data distribution policy includes storage information of a storage apparatus, where the storage apparatus is configured to store context information of a user equipment UE; and saving, by the processing apparatus, context information of a UE into the storage apparatus according to the data distribution policy, or acquiring context information of a UE from the storage apparatus according to the data distribution policy. In this case, a service of the UE may be resumed according to the acquired context information, and uninterrupted service processing is achieved even if the processing network element is faulty or the processing node is faulty, thereby improving security and reliability of processing.

19 Claims, 9 Drawing Sheets

(51) Int. Cl.
   *H04W 8/30*      (2009.01)
   *G06F 11/14*     (2006.01)

(56) References Cited

U.S. PATENT DOCUMENTS

| | | | |
|---|---|---|---|
| 2011/0250892 A1 | 10/2011 | Gupta et al. | |
| 2013/0182555 A1* | 7/2013 | Raaf | H04W 36/0033 370/216 |
| 2014/0362775 A1* | 12/2014 | Steiner | H04W 76/045 370/329 |
| 2015/0112933 A1* | 4/2015 | Satapathy | G06F 17/30575 707/634 |
| 2015/0120915 A1* | 4/2015 | Erb | H04L 63/20 709/224 |
| 2015/0169345 A1* | 6/2015 | DeCusatis et al. | G06F 9/45545 718/1 |

FOREIGN PATENT DOCUMENTS

| | | |
|---|---|---|
| CN | 101730124 A | 6/2010 |
| CN | 101242645 B | 2/2011 |
| CN | 101998670 A * | 3/2011 |
| CN | 102823295 A | 12/2012 |
| EP | 1428397 A | 6/2004 |
| EP | 2373113 A1 | 10/2011 |
| EP | 1898580 B1 | 11/2011 |
| EP | 2387270 A1 | 11/2011 |
| EP | 2757856 A1 * | 1/2013 |
| EP | 3001763 A1 | 3/2016 |
| RU | 2407196 C2 | 12/2010 |
| WO | WO 03043364 A1 | 5/2003 |
| WO | 2009026190 A2 | 2/2009 |
| WO | 2010151846 A1 | 12/2010 |
| WO | WO 2011141154 A1 | 11/2011 |

* cited by examiner

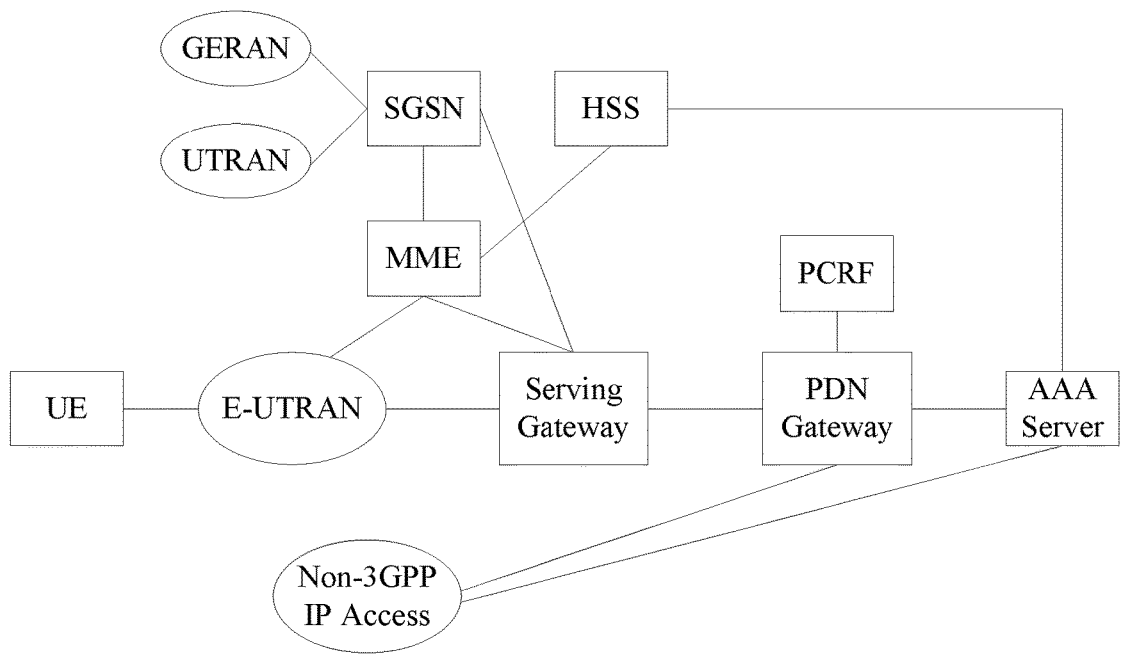

FIG. 1

```
┌─────────────────────────────────────────────────────┐
│  A processing apparatus acquires a data distribution policy, │
│ where the data distribution policy includes storage information │
│     of a storage apparatus, where the storage apparatus is    │──── 201
│ configured to store context information of a user equipment UE │
└─────────────────────────────────────────────────────┘
                           │
                           ▼
┌─────────────────────────────────────────────────────┐
│   The processing apparatus saves context information of a UE  │
│    into the storage apparatus according to the data distribution │──── 202
│     policy, or acquires context information of a UE from the   │
│    storage apparatus according to the data distribution policy │
└─────────────────────────────────────────────────────┘
```

FIG. 2

COMMUNICATION DATA PROCESSING METHOD, APPARATUS, AND SYSTEM

CROSS-REFERENCE TO RELATED APPLICATIONS

This application is a continuation of International Application No. PCT/CN2014/072404, filed on Feb. 21, 2014, which is hereby incorporated by reference in its entirety.

TECHNICAL FIELD

Embodiments of the present invention relate to communications technologies, and in particular, to a communication data processing method, an apparatus, and a system.

BACKGROUND

FIG. 1 is a schematic diagram of a system architecture evolution (System Architecture Evolution, SAE for short) network architecture. As shown in FIG. 1, the SAE network architecture includes: an evolved UMTS terrestrial radio access network (Evolved UMTS Terrestrial Radio Access Network, E-UTRAN for short) that is used for implementing all wireless-related functions of an evolved network and may also be referred to as an E-UTRAN NodeB (E-UTRAN NodeB, eNodeB for short); a mobility management network element (Mobility Management Entity, MME for short) that is responsible for mobility management of a control plane, including management of a context and a mobility status of a user equipment (User Equipment, UE for short), allocation of a temporary user identity, and the like; a serving gateway (Serving Gateway, SGW for short) that is a user plane anchor between 3GPP access networks and is an interface for terminating a connection to the E-UTRAN; a packet data network gateway (Packet Data Network Gateway, PGW for short) that is a user plane anchor between a 3GPP access network and a non-3GPP access network and is an interface for terminating a connection to an external packet data network (Packet Data Network, PDN for short); a policy and charging rules function entity (Policy and Charging Rule Function, PCRF for short) that is used for policy control and decision and flow based charging control; a home subscriber server (Home Subscriber Server, HSS for short) that is used for storing user subscription information; a UMTS terrestrial radio access network (Terrestrial Radio Access Network, UTRAN for short) and a GSM/EDGE radio access network (GSM/EDGE Radio Access Network, GERAN for short) that are used for implementing all wireless-related functions in existing GPRS/UMTS networks, where the UTRAN includes a radio network controller (Radio Network Controller, RNC for short) network element and a base station (NodeB) network element, and the GERAN includes a base station controller (Base Station Controller, BSC for short) network element and a base station (Base Transceiver Station, BTS for short) network element; a serving general packet radio service support node (Serving GPRS Supporting Node, SGSN for short) that is used for implementing such functions in GPRS/UMTS networks as routing and forwarding, mobility management, session management, and user information storage; non-3GPP IP access networks (Non-3GPP IP Access) that are mainly some access networks defined by non-3GPP organizations, such as a wireless local area network (Wireless Local Area Network, WLAN for short), worldwide interoperability for microwave access network (Worldwide Interoperability for Microwave Access, Wimax for short), and code division multiple access network (Code Division Multiple Access, CDMA for short); and an authentication, authorization and accounting server (Authentication, Authorization and Accounting Server, AAA Server for short) that is used for performing access authentication, authorization and accounting functions on a UE.

In the foregoing existing SAE architecture, when a network element is reset due to a fault, a context of a UE stored in the network element is deleted, causing an interruption of an ongoing service of the UE after the network element recovers. To continue with the service, the UE has to re-register with a network and re-initiate the service. More seriously, the UE generally does not perceive the fault in the NE on a network side, and therefore, does not initiate a registration process to re-register with the network and re-initiate the service. Therefore, all services of the UE are actually unavailable.

SUMMARY

Embodiments of the present invention provide a communication data processing method, an apparatus, and a system.

According to a first aspect, an embodiment of the present invention provides a communication data processing method, including:

acquiring, by a processing apparatus, a data distribution policy, where the data distribution policy includes storage information of a storage apparatus, where the storage apparatus is configured to store context information of a user equipment UE; and saving, by the processing apparatus, context information of a UE into the storage apparatus according to the data distribution policy, or acquiring context information of a UE from the storage apparatus according to the data distribution policy.

According to a second aspect, an embodiment of the present invention provides a communication data processing method, including:

receiving, by a data management network element, a create request message sent by a processing apparatus, or receiving a database instance create function called by a processing apparatus, or receiving a database instance create API called by a processing apparatus;

interacting, by the data management network element, with a storage apparatus according to the create request message, or the create function, or the create API, to determine a data distribution policy, where the data distribution policy includes storage information of the storage apparatus; and sending, by the data management network element, the data distribution policy to the processing apparatus, so that the processing apparatus saves context information of a UE into the storage apparatus according to the data distribution policy, or acquires context information of a UE from the storage apparatus according to the data distribution policy.

According to a third aspect, an embodiment of the present invention provides a communication data processing method, including:

receiving, by a storage apparatus, a context processing request sent by a processing apparatus, where the storage apparatus is a storage network element or a storage node in a storage network element; and performing, by the storage apparatus, processing on a context of a user equipment UE according to the context processing request, where the context processing request is a context storage request or a context acquiring request.

According to a fourth aspect, an embodiment of the present invention provides a processing apparatus, including:

an acquiring module, configured to acquire a data distribution policy, where the data distribution policy includes storage information of a storage apparatus, where the storage apparatus is configured to store context information of a user equipment UE; and a context processing module, configured to save context information of a UE into the storage apparatus according to the data distribution policy, or acquire context information of a UE from the storage apparatus according to the data distribution policy.

According to a fifth aspect, an embodiment of the present invention provides a data management network element, including:

a receiving module, configured to receive a create request message sent by a processing apparatus, or receive a database instance create function called by a processing apparatus, or receive a database instance create API called by a processing apparatus;

a determining module, configured to interact with a storage apparatus according to the create request message, or the create function, or the create API, to determine a data distribution policy, where the data distribution policy includes storage information of the storage apparatus; and a sending module, configured to send the data distribution policy to the processing apparatus, so that the processing apparatus saves context information of a UE into the storage apparatus according to the data distribution policy, or acquires context information of a UE from the storage apparatus according to the data distribution policy.

According to a sixth aspect, an embodiment of the present invention provides a storage apparatus, including:

a receiving module, configured to receive a context processing request sent by a processing apparatus; and a processing module, configured to perform processing on a context of a user equipment UE according to the context processing request, where the context processing request is a context storage request or a context acquiring request.

According to a seventh aspect, an embodiment of the present invention provides a processing apparatus, including:

a processor, a memory, and at least one communications interface, where the communications interface is configured to communicate with an external device, the memory is configured to store a computer program instruction, and the processor is configured to call the computer program instruction stored in the memory, so as to execute the following operations:

acquiring a data distribution policy, where the data distribution policy includes storage information of a storage apparatus, where the storage apparatus is configured to store context information of a user equipment UE; and saving context information of a UE into the storage apparatus according to the data distribution policy, or acquiring context information of a UE from the storage apparatus according to the data distribution policy.

According to an eighth aspect, an embodiment of the present invention provides a data management network element, including:

a processor, a memory, and at least one communications interface, where the communications interface is configured to communicate with an external device, the memory is configured to store a computer program instruction, and the processor is configured to call the computer program instruction stored in the memory, so as to execute the following operations:

receiving a create request message sent by a processing apparatus, or receiving a database instance create function called by a processing apparatus, or receiving a database instance create API called by a processing apparatus;

interacting with a storage apparatus according to the create request message, or the create function, or the create API, to determine a data distribution policy, where the data distribution policy includes storage information of the storage apparatus; and sending the data distribution policy to the processing apparatus, so that the processing apparatus saves context information of a UE into the storage apparatus according to the data distribution policy, or acquires context information of a UE from the storage apparatus according to the data distribution policy.

According to a ninth aspect, an embodiment of the present invention provides a storage apparatus, including:

a processor, a memory, and at least one communications interface, where the communications interface is configured to communicate with an external device, the memory is configured to store a computer program instruction, and the processor is configured to call the computer program instruction stored in the memory, so as to execute the following operations:

receiving a context processing request sent by a processing apparatus; and performing processing on a context of a user equipment UE according to the context processing request, where the context processing request is a context storage request or a context acquiring request.

According to a tenth aspect, an embodiment of the present invention provides a communications system, including: the foregoing processing apparatus, the foregoing data management network element, and the foregoing storage apparatus.

In the embodiments of the present invention, context information of a UE is independently stored in a storage apparatus that is separated from a processing apparatus that performs UE-related signaling processing and data plane forwarding processing, so that after a processing network element or a processing node becomes faulty, the context information of the UE can be acquired from a storage network element or a storage node. In this case, a service of the UE may be resumed according to the acquired context information, and uninterrupted service processing is achieved even if the processing network element is faulty or the processing node is faulty, thereby improving security and reliability of processing.

BRIEF DESCRIPTION OF DRAWINGS

FIG. 1 is a schematic diagram of a system architecture evolution (System Architecture Evolution, SAE for short) network architecture;

FIG. 2 is a flowchart of Embodiment 1 of a communication data processing method according to the present invention;

DESCRIPTION OF EMBODIMENTS

Figure 3:
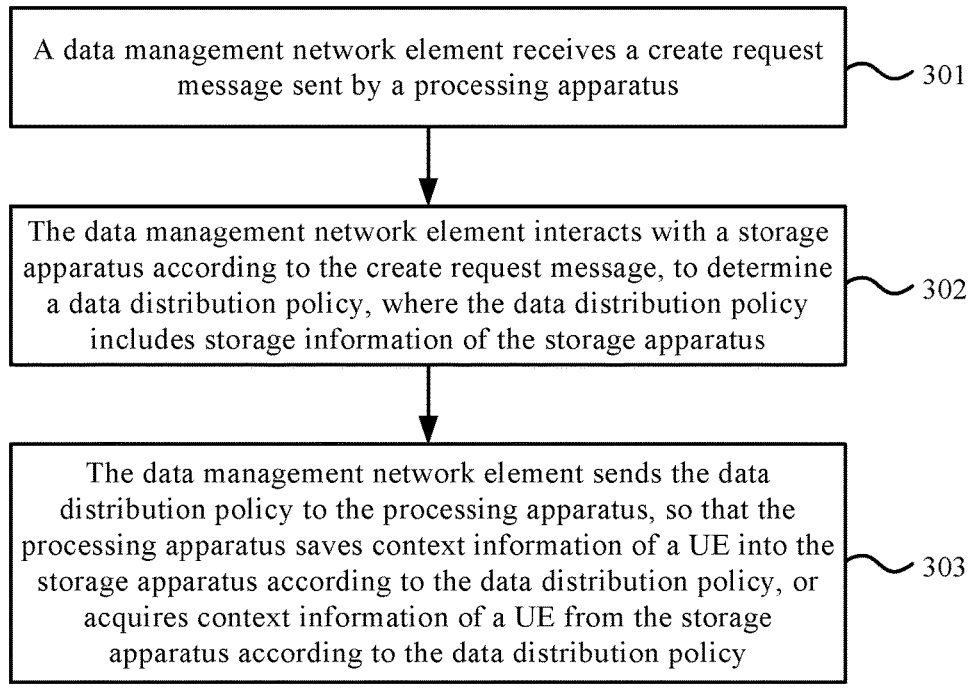
FIG. 3 is a flowchart of Embodiment 2 of a communication data processing method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

FIG. 2 is a flowchart of Embodiment 1 of a communication data processing method according to the present invention. As shown in FIG. 2, the method in this embodiment may include:

S201: A processing apparatus acquires a data distribution policy, where the data distribution policy includes storage information of a storage apparatus, where the storage apparatus is configured to store context information of a user equipment UE.

S202: The processing apparatus saves context information of a UE into the storage apparatus according to the data distribution policy, or acquires context information of a UE from the storage apparatus according to the data distribution policy.

The processing apparatus is a processing network element, or a processing node in a processing network element.

The storage apparatus is a storage network element, or a storage node in a storage network element.

Specifically, in an existing SAE architecture, computation processing and storage processing are combined, that is, a network element in a related SAE architecture not only performs UE-related signaling processing and data plane forwarding processing (these types of processing may be referred to as computation processing) but also performs storage processing on a UE-related context (this types of processing may be referred to as storage processing). For example, an MME not only performs processing on mobility management signaling and session signaling of a UE, but also performs storage processing on an MM context information and EPS bearer context information of the UE; an SGW and a PGW not only perform session signaling processing and data plane forwarding processing, but also perform storage processing on EPS bearer context information.

In this type of network architecture, because UE-related context information stored in a network element is also deleted when the network element is reset due to a fault, the UE-related context information cannot be restored after the network element recovers, which means that all ongoing services of the UE are interrupted. To continue with the services, the UE needs to re-register with a network and re-initiate the services. More seriously, the UE generally does not perceive the fault in the network element on a network side, which means that the UE considers, for a period of time, its services to be normal, and does not initiate a registration process to re-register with the network or re-initiate a service. Therefore, all the services (including a voice service) of the UE are actually unavailable during this period of time, which greatly affects user experience of the UE. Furthermore, because the computation processing and the storage processing are combined, a processing capability and a storage capability of each network element are bound together, which also means that the processing capability of the network element cannot be freely scaled up and down and is mapped to the storage capability in a one-to-one manner. In addition, because processing of the UE has to be performed in a network element in which a context of the UE is stored, a service of the UE cannot be migrated to another network element in a hitless manner.

Therefore, this embodiment uses an architecture in which storage and computation are separated. Specifically, the architecture in this embodiment may include: a processing apparatus, a data management network element, and a storage apparatus. Functions of each part are as follows:

The processing apparatus: acquires a data distribution policy from the data management network element, where the data distribution policy may include storage information of the storage apparatus; and saves context information of a UE into the storage apparatus according to the data distribution policy, or acquires context information of a UE from the storage apparatus according to the data distribution policy. Specifically, the processing apparatus may send a create request message to the data management network element, where the create request message may include storage requirement information of the processing apparatus, so that the data management network element can interact with the storage apparatus according to the create request message, to determine the data distribution policy, and then, the data management network element can feed back the determined data distribution policy to the processing apparatus. More specifically, the processing apparatus may request the data management network element to create a corresponding database instance, so that the data management network element can interact with the storage apparatus according to the database instance, to determine the data distribution policy. In specific implementation, the data distribution policy may include: a correspondence between a keyword and a storage identifier, where the storage identifier may be an identifier of a storage network element or an identifier of a storage node in a storage network element, so that the processing apparatus may determine a keyword corresponding to identifier information of the UE, determine a storage identifier according to the determined keyword and the correspondence, and save the context information of the UE into the storage apparatus according to the storage identifier or acquire the context information of the UE from the storage apparatus according to the storage identifier.

The storage identifier includes address information (for example, an IP address) of the storage apparatus, address information and port number information of the storage apparatus, fully qualified domain name (Fully Qualified Domain Name, FQDN for short) information of the storage apparatus, FQDN information and number Port information of the storage apparatus, or the like.

The data management network element: determines a data distribution policy according to a request sent by the processing apparatus, and sends the data distribution policy to the processing apparatus. Specifically, the data management network element may receive a create request message sent by the processing apparatus, where the create request message may include storage requirement information of the processing apparatus; the data management network element may interact with the storage apparatus according to the create request message, to determine the data distribution policy; and then, the data management network element may feed back the determined data distribution policy to the processing apparatus. More specifically, that the data management network element determines the data distribution policy includes: the data management network element may create a database instance according to the request from the processing apparatus; the data management network element requests, according to the database instance, the storage apparatus to allocate storage space; and the data management network element creates and then determines the data distribution policy according to the created database instance and the storage apparatus that is corresponding to the database instance.

The storage apparatus: stores context information of a UE, and responds to a context storage request sent by the processing apparatus to save context information of a UE, or responds to a context acquiring request sent by the processing apparatus to feed back a context that is of a UE and obtained by means of querying to the UE.

In this embodiment, the processing apparatus may be a processing network element, or may be a processing node in a processing network element. The processing network element is a logical network element that may perform UE-related signaling processing or data plane forwarding processing, where the signaling processing may include: MM signaling processing, session management (SM) signaling processing, or air interface signaling processing. The processing network element may be deployed on multiple virtual machines or multiple physical machines (for example, multiple servers), and the processing network element may be a network element in an SAE network, such as an SGSN, an MME, an SGW, a PGW, a PCRF, an RNC, a NodeB, an eNodeB, a BSC, and a BTS, or may be a control plane network element (for example, a controller in an SDN architecture) or a forwarding plane network element (for example, a switch) in a future network architecture. The processing node in this embodiment may be a processing process in the processing network element (a virtual machine or a physical machine), or may be a board in the processing network element (a physical machine), or the like. Multiple processing nodes in one processing network element may be located on multiple virtual machines or physical machines.

Similarly, the storage apparatus in this embodiment may be a storage network element, or may be a storage node in a storage network element. The storage node may be a storage process in the storage network element (a virtual machine or a physical machine), or may be a board or memory space in the storage network element (a physical machine), or the like. Multiple storage nodes in one storage network element may be located on multiple virtual machines or physical machines.

Furthermore, the data management network element and the storage network element in this embodiment are logical network elements that may be physical hardware devices (for example, servers) or may be virtual machines. The data management network element and the storage network element may be deployed on multiple virtual machines or multiple physical machines. The data management network element and the storage network element are logically separated, and physically, may be deployed on a same server or may be deployed on different servers.

Furthermore, the data management network element in this embodiment mainly performs management on the storage apparatus, for example, creating a database instance, requesting the storage apparatus to allocate storage space, and the like. The data management network element may be an independent network element, or may be integrated into the processing apparatus (that is, the processing apparatus includes a data management function) or is integrated into an operations support system (Operations Support System, OSS for short) (that is, the OSS includes a data management function).

Therefore, in this embodiment, context information of a UE is independently stored in a storage apparatus that is separated from a processing apparatus that performs UE-related signaling processing and data plane forwarding processing, so that after a processing network element or a processing node becomes faulty, the context information of the UE can be acquired from a storage network element or a storage node. In this case, a service of the UE may be resumed according to the acquired context information, and uninterrupted service processing is achieved even if the processing network element is faulty or the processing node is faulty, thereby improving security and reliability of processing.

Further, because storage processing and computation processing are not performed in a same network element, the computation processing may be migrated from one processing network element or one processing node to another processing network element or another processing node in a hitless manner, thereby implementing hitless migration. In this way, in a case of low network load (for example, generally, network load of an operator is relatively low in a period of time from 12:00 am to 6:00 am), computation processing may be performed in several processing network elements or several processing nodes in a centralized manner, thereby implementing energy saving and emission reduction; after the network load increases, more processing network elements or processing nodes can be easily added to perform computation processing, and therefore, load on each processing network element or each processing node decreases, thereby implementing free capacity scalability.

FIG. 3 is a flowchart of Embodiment 2 of a communication data processing method according to the present invention. The method in this embodiment is a processing process executed by a data management network element. As shown in FIG. 3, the method in this embodiment includes:

S301: The data management network element receives a create request message sent by a processing apparatus.

In this embodiment, a function call may also be used between the data management network element and the processing apparatus, for example, the processing apparatus calls a database instance create function of the data management network element; or an application programming interface (Application Programming Interface, API for short) call is used between the data management network element and the processing apparatus, for example, the processing apparatus calls a database instance create API of the data management network element.

S302: The data management network element interacts with a storage apparatus according to the create request message, to determine a data distribution policy, where the data distribution policy includes storage information of the storage apparatus.

S303: The data management network element sends the data distribution policy to the processing apparatus, so that the processing apparatus saves context information of a UE into the storage apparatus according to the data distribution policy, or acquires context information of a UE from the storage apparatus according to the data distribution policy.

Further, the create request message may include storage requirement information of the processing apparatus (for example, required memory for storage, or a required CPU processing capability for storage).

Correspondingly, S302 may specifically be:

the data management network element creates a database instance according to the create request message; and the data management network element interacts with the storage apparatus according to the database instance, to determine the data distribution policy.

More specifically, S302 may specifically be:

the data management network element determines, according to the database instance and performance information of the storage apparatus, a performance specification required to be allocated by the storage apparatus (for example, memory or a CPU processing capability required to be allocated);

the data management network element interacts with the storage apparatus, to request the storage apparatus to allocate storage space meeting a requirement of the performance specification; and the data management network element generates the data distribution policy, where the data distribution policy includes:

a correspondence between a keyword and a storage identifier, where the storage identifier is an identifier of an allocating storage network element or an identifier of a storage node in an allocating storage network element.

A specific implementation principle of this embodiment is similar to the specific implementation principle described in the embodiment shown in FIG. 2, which is not described herein again.

Figure 4:
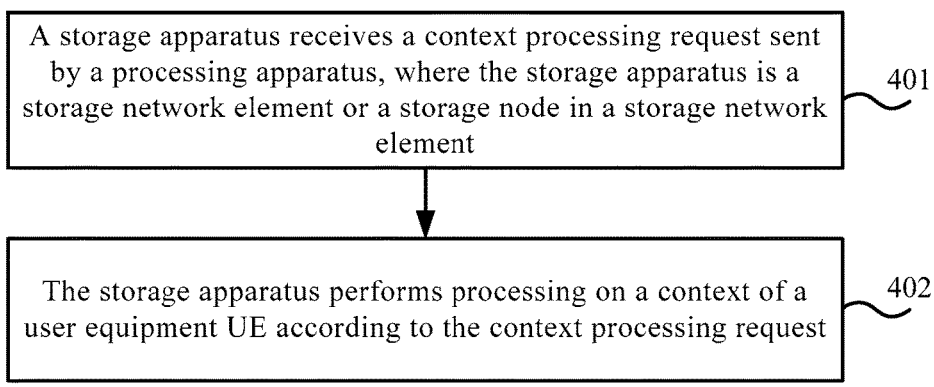
FIG. 4 is a flowchart of Embodiment 3 of a communication data processing method according to the present invention.

FIG. 4 is a flowchart of Embodiment 3 of a communication data processing method according to the present invention. The method in this embodiment is a processing process executed by a storage apparatus. As shown in FIG. 4, the method in this embodiment includes:

S401: The storage apparatus receives a context processing request sent by a processing apparatus, where the storage apparatus is a storage network element or a storage node in a storage network element.

S402: The storage apparatus performs processing on a context of a user equipment UE according to the context processing request.

The context processing request is a context storage request or a context acquiring request; the processing apparatus is a processing network element, or a processing node in a processing network element; the storage apparatus is a storage network element, or a storage node in a storage network element.

Further, in a case in which the context processing request is the context storage request, S401 is specifically:

the storage apparatus receives the context storage request sent by the processing apparatus, where the context storage request includes context information of the UE and identifier information of the UE; and correspondingly, S402 is specifically:

the storage apparatus determines, according to the identifier information of the UE, whether context information of the UE is stored; and if the context information of the UE is stored, perform update processing on the stored context information of the UE by using the context information of the UE included in the context storage request; or if the context information of the UE is not stored, save the context information of the UE included in the context storage request as a new record.

Further, in a case in which the context processing request is the context acquiring request, S401 is specifically:

the storage apparatus receives the context acquiring request sent by the processing apparatus, where the context acquiring request includes identifier information of the UE; and correspondingly, S402 is specifically:

the storage apparatus acquires context information of the UE by means of querying according to the identifier information of the UE; and the storage apparatus sends the context information of the UE acquired by means of querying to the processing apparatus.

A specific implementation principle of this embodiment is similar to the specific implementation principle described in the embodiment shown in FIG. 2, which is not described herein again.

The following uses several specific embodiments to describe in detail the foregoing technical solutions in the embodiments shown in FIG. 2 to FIG. 4.

Figure 5:
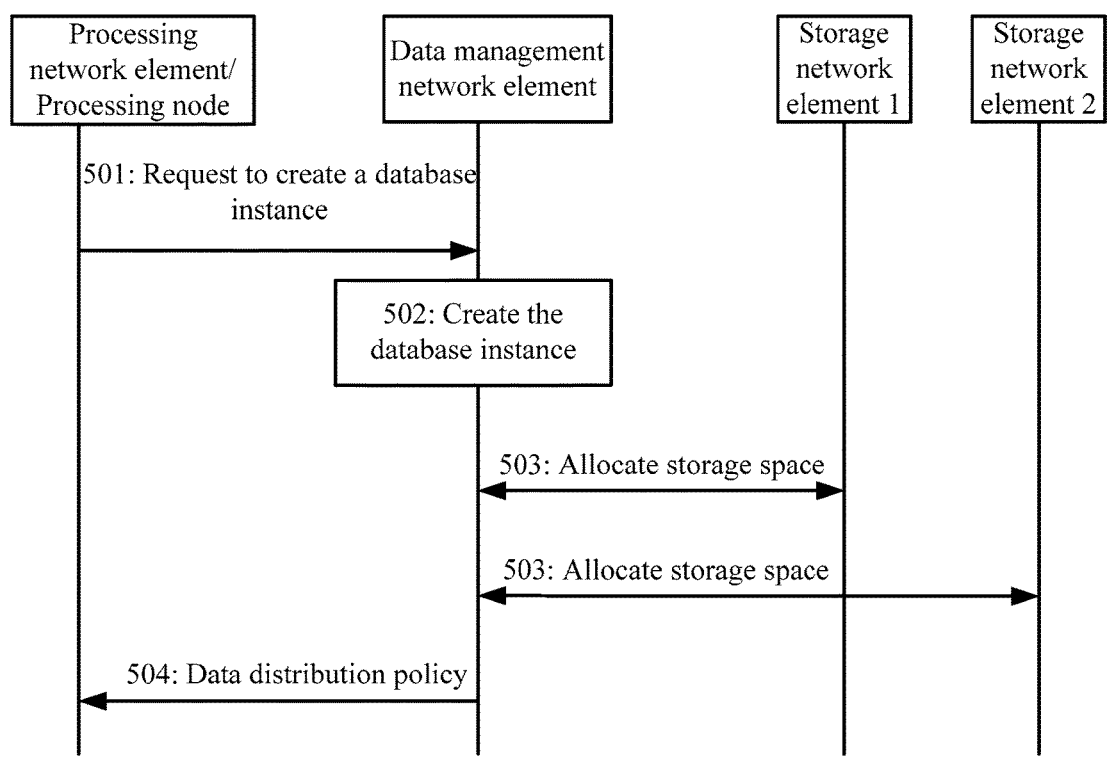
FIG. 5 is a signaling flowchart of Embodiment 4 of a communication data processing method according to the present invention.
Figure 6:
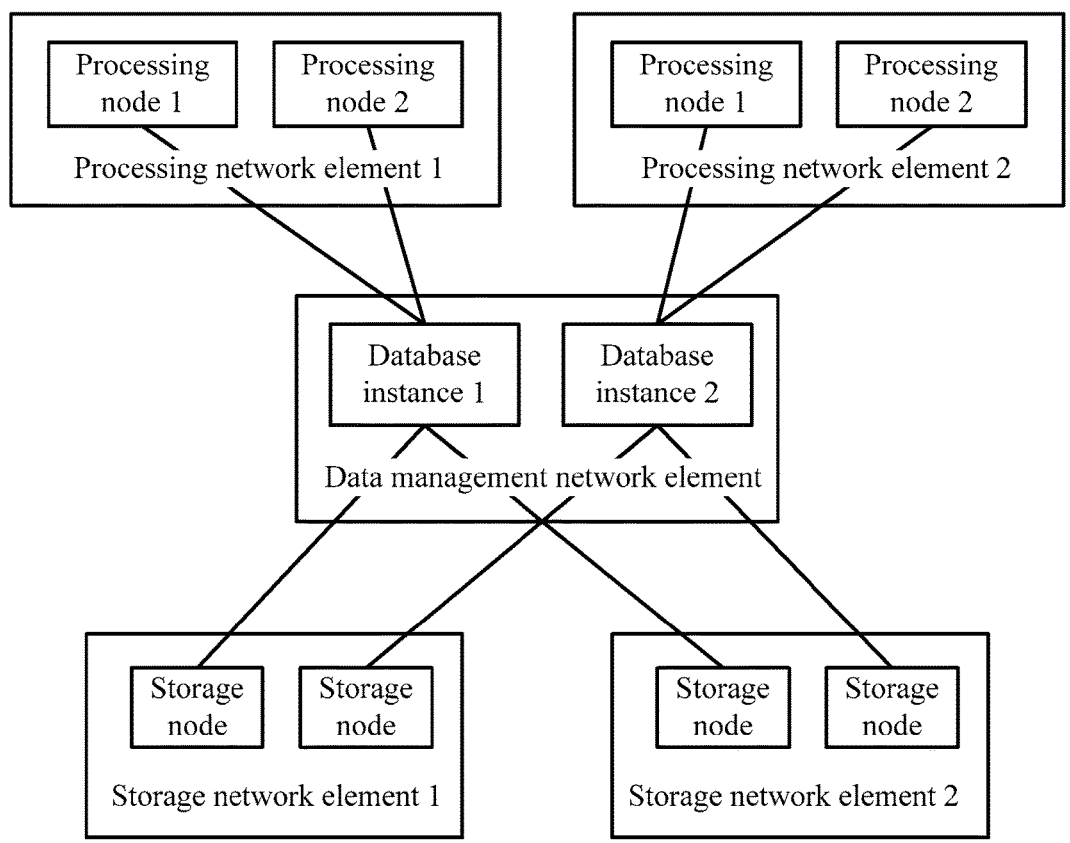
FIG. 6 is a schematic diagram of a network architecture used in a method embodiment shown in FIG. 5.

FIG. 5 is a signaling flowchart of Embodiment 4 of a communication data processing method according to the present invention; FIG. 6 is a schematic diagram of a network architecture used in a method embodiment shown in FIG. 5. As shown in FIG. 5 and FIG. 6, the method in this embodiment may include:

S501: A processing network element/processing node requests a data management network element to create a database instance.

The request may include storage requirement information of the processing network element/processing node, for example, a size of required memory space or a required CPU processing capability.

S502: The data management network element creates the database instance according to the request from the processing network element/processing node.

Specifically, the data management network element may create the database instance according to the storage requirement information of the processing network element/processing node.

S503: The data management network element interacts with a storage network element according to the database instance and performance information of the storage network element, to request the storage network element to allocate storage space.

Specifically, the data management network element may acquire the performance information of the storage network element in advance, for example, information about current load; the data management network element determines, according to the database instance and the performance information of the storage network element, a performance specification required to be allocated by the storage network element, for example, an amount of memory required to be allocated by the storage network element; and then, the data management network element can request the storage network element to allocate storage space meeting a requirement of the performance specification, for example, to allocate a storage node, where a storage network element may allocate one or more storage nodes for one processing network element/processing node.

S504: The data management network element feeds back a data distribution policy to the processing network element/processing node.

The data management network element creates the data distribution policy according to the created database instance and a storage network element or a storage node corresponding to the database instance. The data distribution policy may include a correspondence between a keyword (Key) and a storage identifier.

The processing network element/processing node may save the data distribution policy. When context information of a UE needs to be stored, the processing network element/processing node may perform hash operation on identifier information of the UE to obtain a Key corresponding to the identifier information of the UE; a storage network element/storage node identifier corresponding to the Key can be determined by querying the data distribution policy by using the Key obtained by means of calculation; and then the processing network element/processing node may save the context information of the UE into the storage network element/storage node corresponding to the storage network element/storage node identifier, or acquire the context information of the UE from the storage network element/storage node corresponding to the storage network element/storage node identifier.

Figure 7:
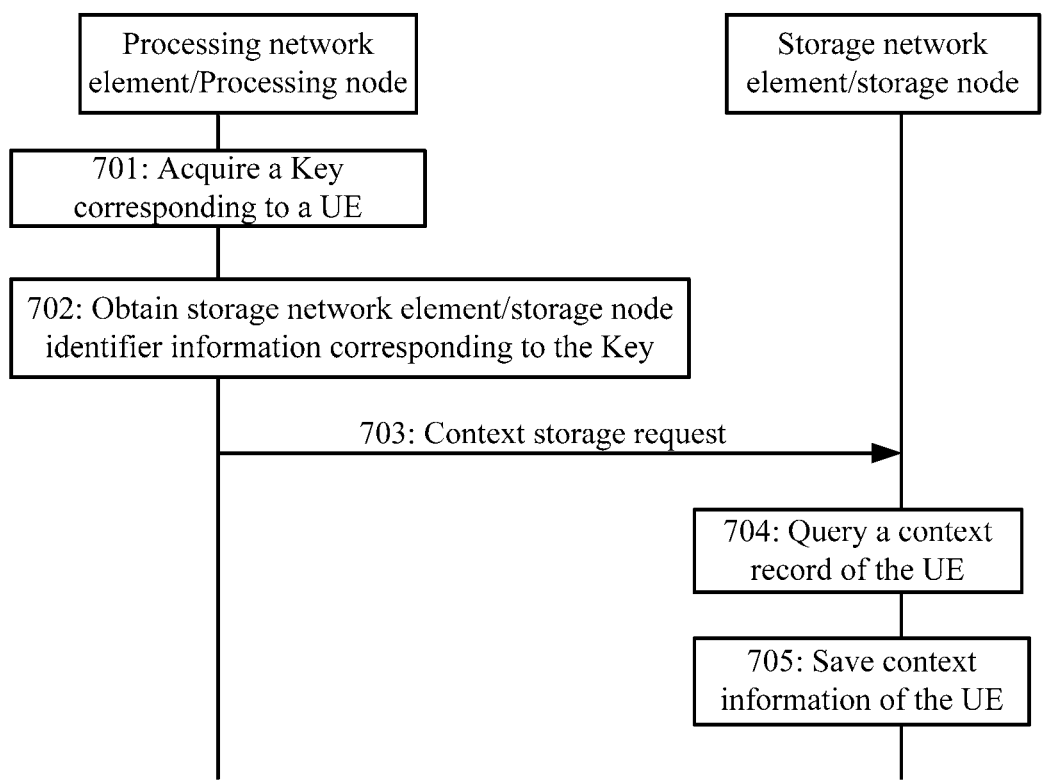
FIG. 7 is a signaling flowchart of Embodiment 5 of a communication data processing method according to the present invention.

FIG. 7 is a signaling flowchart of Embodiment 5 of a communication data processing method according to the present invention. As shown in FIG. 6 and FIG. 7, after a UE accesses a network, a processing network element/processing node may acquire context information of the UE, and save the context information of the UE into a storage network element/storage node according to a data distribution policy. The method in this embodiment may include:

S701: A processing network element/processing node acquires a Key corresponding to a UE.

Specifically, the processing network element/processing node may perform hash operation on identifier information of the UE to obtain the corresponding Key.

S702: The processing network element/processing node queries a data distribution policy according to the acquired Key, to obtain storage network element/storage node identifier information corresponding to the Key.

S703: The processing network element/processing node sends a context storage request to a corresponding storage network element/storage node according to the acquired storage network element/storage node identifier information.

The context storage request may include an identifier and to-be-saved context information of the UE.

S704: The storage network element/storage node queries a context record of the UE after receiving the storage request from the processing network element/processing node, to determine whether context information of the UE is stored.

Specifically, the storage network element/storage node may store a UE context information table, where the table includes a correspondence between a Key and context information of a UE; the storage network element/storage node may perform hash operation on the identifier information of the UE to obtain the Key, and query the UE context information table according to the Key, so as to determine whether the context information of the UE is stored.

S705: The storage network element/storage node saves context information of the UE.

Specifically, if in S704, the storage network element/storage node does not find a context record of the UE in the UE context information table, the storage network element/storage node creates a new record in the UE context information table, and saves the context information of the UE in the created record; if in S704, the storage network element/storage node finds a context record of the UE in the UE context information table, the storage network element/storage node adds new data to context information of the UE in this record, and updates a field corresponding to the context information of the UE in this record by using updated data.

Figure 8:
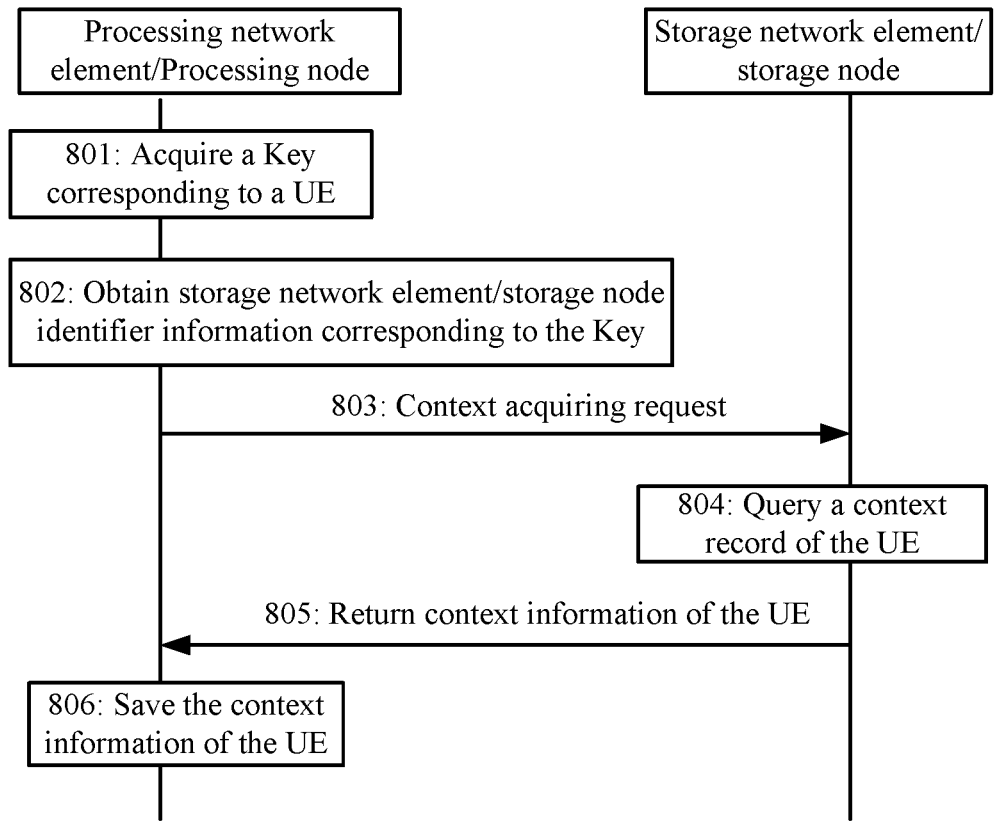
FIG. 8 is a signaling flowchart of Embodiment 6 of a communication data processing method according to the present invention.

FIG. 8 is a signaling flowchart of Embodiment 6 of a communication data processing method according to the present invention. As shown in FIG. 6 and FIG. 8, after recovery from a fault, a processing network element/processing node may acquire context information of a UE from a storage apparatus according to a data distribution policy. The method in this embodiment may include:

S801: A processing network element/processing node acquires a Key corresponding to identifier information of a UE.

S802: The processing network element/processing node queries a data distribution policy according to the acquired Key, to obtain storage network element/storage node identifier information corresponding to the Key.

S803: The processing network element/processing node sends a context acquiring request to a corresponding storage network element/storage node according to the acquired storage network element/storage node identifier information, where the context acquiring request includes the identifier information of the UE.

S804: The storage network element/storage node queries a context record of the UE after receiving the context acquiring request from the processing network element/processing node, to determine whether context information of the UE is stored.

S805: The storage network element/storage node feeds back the context information of the UE.

Specifically, if the storage network element/storage node does not find a context record of the UE in a UE context information table, the storage network element/storage node may return, to the processing network element/processing node, information that data does not exist; if the storage network element/storage node finds a context record of the UE in the UE context information table, the storage network element/storage node returns found context information of the UE to the processing network element/processing node.

S806: The processing network element/processing node saves the context information of the UE.

Figure 9:
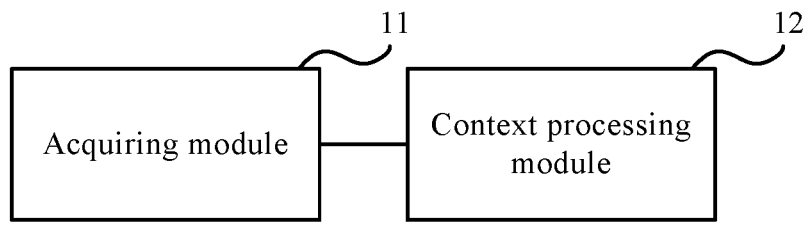
FIG. 9 is a schematic structural diagram of Embodiment 1 of a processing apparatus according to the present invention.

FIG. 9 is a schematic structural diagram of Embodiment 1 of a processing apparatus according to the present invention. As shown in FIG. 9, the apparatus in this embodiment may include:

an acquiring module 11, configured to acquire a data distribution policy, where the data distribution policy includes storage information of a storage apparatus, where the storage apparatus is configured to store context information of a user equipment UE; and a context processing module 12, configured to save context information of a UE into the storage apparatus according to the data distribution policy, or acquire context information of a UE from the storage apparatus according to the data distribution policy.

The processing apparatus is a processing network element, or a processing node in a processing network element.

The storage apparatus is a storage network element, or a storage node in a storage network element.

Further, the acquiring module 11 is specifically configured to:

send a create request message to a data management network element, or call a database instance create function of a data management network element, or call a database instance create API of a data management network element, so that the data management network element interacts with the storage apparatus according to the create request message, or the create function, or the create API, to determine the data distribution policy; and receive the data distribution policy sent by the data management network element.

Further, the create request message, or the create function, or the create API includes storage requirement information of the processing apparatus, so that the data management network element requests, according to the storage requirement information, the storage apparatus to allocate storage space.

Still further, the data distribution policy includes:

a correspondence between a keyword and a storage identifier, where the storage identifier is an identifier of a storage network element or an identifier of a storage node in a storage network element.

The context processing module 12 is specifically configured to:

determine a keyword corresponding to identifier information of the UE, and determine a storage identifier according to the determined keyword and the correspondence; and save the context information of the UE into the storage apparatus according to the storage identifier, or acquire the context information of the UE from the storage apparatus according to the storage identifier.

Further, the context processing module 12 is specifically configured to:

perform hash operation on the identifier information of the UE, to obtain the keyword corresponding to the identifier information of the UE.

Further, the context processing module 12 is specifically configured to:

acquire the context information of the UE after the UE accesses a network, and save the context information of the UE into the storage apparatus according to the data distribution policy;

or after recovery from a fault, acquire the context information of the UE from the storage apparatus according to the data distribution policy.

Figure 10:
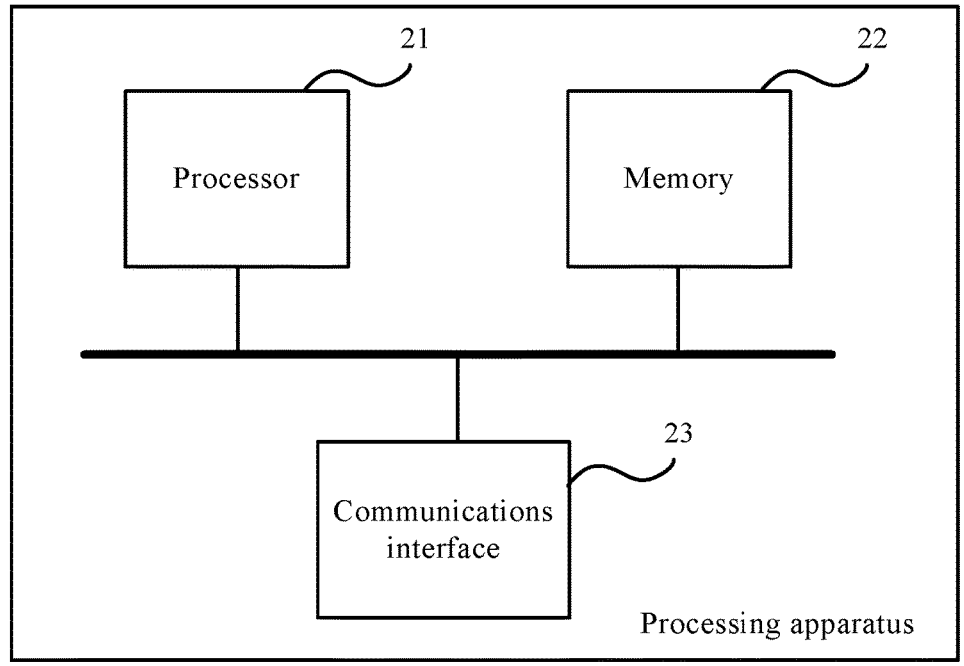
FIG. 10 is a schematic structural diagram of Embodiment 2 of a processing apparatus according to the present invention.

FIG. 10 is a schematic structural diagram of Embodiment 2 of a processing apparatus according to the present invention. As shown in FIG. 10, the apparatus in this embodiment may include: a processor 21, a memory 22, and at least one communications interface 23, where the communications interface 23 is configured to communicate with an external device, the memory 22 is configured to store a computer program instruction, and the processor 21 is configured to call the computer program instruction stored in the memory 22, so as to execute the following operations:

acquiring a data distribution policy, where the data distribution policy includes storage information of a storage apparatus, where the storage apparatus is configured to store context information of a user equipment UE; and saving context information of a UE into the storage apparatus according to the data distribution policy, or acquiring context information of a UE from the storage apparatus according to the data distribution policy.

The processing apparatus is a processing network element, or a processing node in a processing network element.

The storage apparatus is a storage network element, or a storage node in a storage network element.

Further, the processor 21 is specifically configured to:

send a create request message to a data management network element, or call a database instance create function of a data management network element, or call a database instance create API of a data management network element, so that the data management network element interacts with the storage apparatus according to the create request message, or the create function, or the create API, to determine the data distribution policy; and receive the data distribution policy sent by the data management network element.

The create request message, or the create function, or the create API includes storage requirement information of the processing apparatus, so that the data management network element requests, according to the storage requirement information, the storage apparatus to allocate storage space.

Further, the so that the data management network element interacts with the storage apparatus according to the create request message, or the create function, or the create API, to determine the data distribution policy specifically includes:

the data management network element creates a database instance according to the create request message, or the create function, or the create API;

the data management network element requests the storage apparatus to allocate storage space; and the data management network element creates the data distribution policy according to the created database instance and the storage apparatus that is corresponding to the database instance.

Further, the data distribution policy includes:

a correspondence between a keyword and a storage identifier, where the storage identifier is an identifier of a storage network element or an identifier of a storage node in a storage network element; and the processor 21 is specifically configured to:

determine a keyword corresponding to identifier information of the UE, and determine a storage identifier according to the determined keyword and the correspondence; and save the context information of the UE into the storage apparatus according to the storage identifier, or acquire the context information of the UE from the storage apparatus according to the storage identifier.

Further, the processor 21 is specifically configured to:

perform hash operation on the identifier information of the UE, to obtain the keyword corresponding to the identifier information of the UE.

Further, the processor 21 is specifically configured to:

acquire the context information of the UE after the UE accesses a network, and save the context information of the UE into the storage apparatus according to the data distribution policy;

or after recovery from a fault, acquire the context information of the UE from the storage apparatus according to the data distribution policy.

In specific implementation, in this embodiment, the processing network element is an SGSN, an MME, an SGW, a PGW, a PCRF, an RNC, a NodeB, an eNodeB, a BSC, or a BTS in an SAE network, or the processing network element is a control plane network element in an SDN architecture, for example, an SDN controller, or a forwarding plane network element, for example, a switch.

Further, the processing node is a processing process or a processing board in the processing network element.

The processing apparatus in the foregoing embodiment may be used to implement the technical solution in the method embodiment shown in FIG. 2, and implementation principles and technical effects thereof are similar and are not described herein again.

Figure 11:
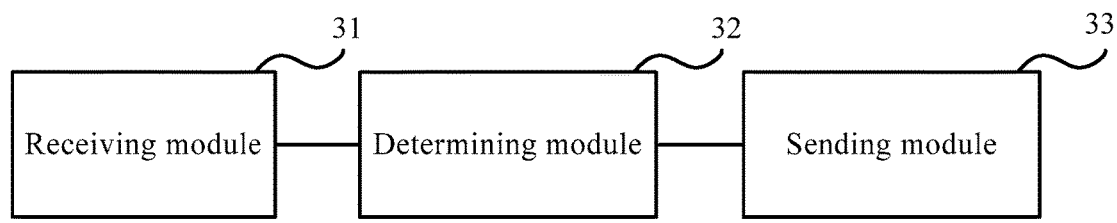
FIG. 11 is a schematic structural diagram of Embodiment 1 of a data management network element according to the present invention.

FIG. 11 is a schematic structural diagram of Embodiment 1 of a data management network element according to the present invention. As shown in FIG. 11, the data management network element in this embodiment may include:

a receiving module 31, configured to receive a create request message sent by a processing apparatus, or receive a database instance create function called by a processing apparatus, or receive a database instance create API called by a processing apparatus;

a determining module 32, configured to interact with a storage apparatus according to the create request message, or the create function, or the create API, to determine a data distribution policy, where the data distribution policy includes storage information of the storage apparatus; and a sending module 33, configured to send the data distribution policy to the processing apparatus, so that the processing apparatus saves context information of a UE into the storage apparatus according to the data distribution policy, or acquires context information of a UE from the storage apparatus according to the data distribution policy.

Further, the create request message, or the create function, or the create API includes storage requirement information of the processing apparatus; and the determining module 32 is specifically configured to:

create a database instance according to the create request message; and interact with the storage apparatus according to the database instance and performance information of the storage apparatus, to determine the data distribution policy.

Further, the determining module 32 is specifically configured to:

determine, according to the database instance and the performance information of the storage apparatus, a performance specification required to be allocated by the storage apparatus;

interact with the storage apparatus, to request the storage apparatus to allocate storage space meeting a requirement of the performance specification; and generate the data distribution policy, where the data distribution policy includes a correspondence between a keyword and a storage identifier, where the storage identifier is an identifier of an allocating storage network element or an identifier of a storage node in an allocating storage network element.

Figure 12:
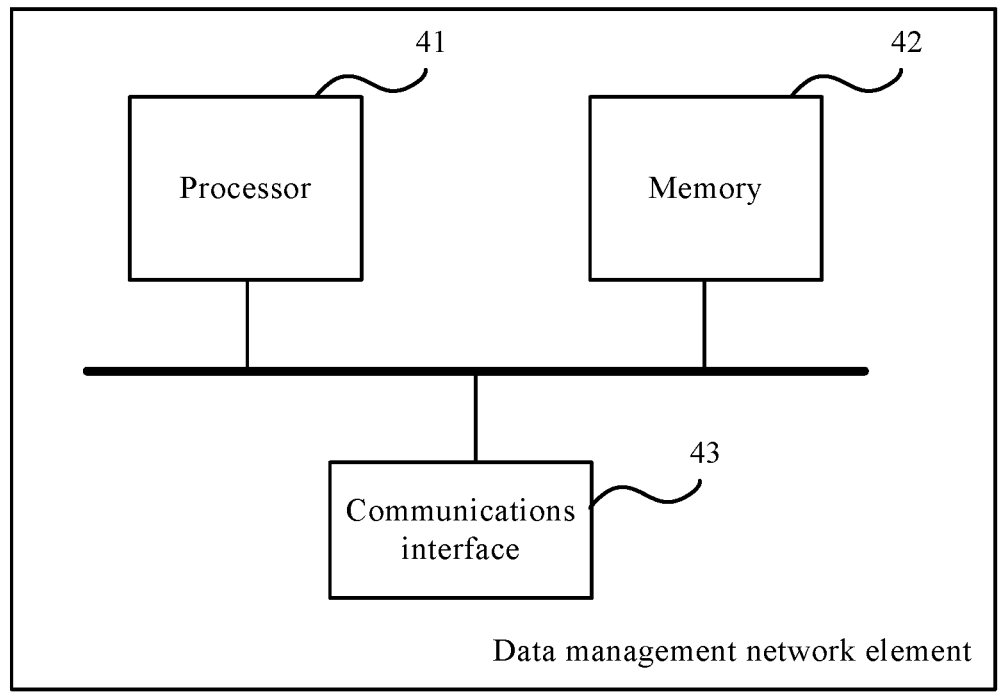
FIG. 12 is a schematic structural diagram of Embodiment 2 of a data management network element according to the present invention.

FIG. 12 is a schematic structural diagram of Embodiment 2 of a data management network element according to the present invention. As shown in FIG. 12, the data management network element in this embodiment may include: a processor 41, a memory 42, and at least one communications interface 43, where the communications interface 43 is configured to communicate with an external device, the memory 42 is configured to store a computer program instruction, and the processor 41 is configured to call the computer program instruction stored in the memory 42, so as to execute the following operations:

receiving a create request message sent by a processing apparatus, or receiving a database instance create function called by a processing apparatus, or receiving a database instance create API called by a processing apparatus;

interacting with a storage apparatus according to the create request message, or the create function, or the create API, to determine a data distribution policy, where the data distribution policy includes storage information of the storage apparatus; and sending the data distribution policy to the processing apparatus, so that the processing apparatus saves context information of a UE into the storage apparatus according to the data distribution policy, or acquires context information of a UE from the storage apparatus according to the data distribution policy.

Further, the create request message, or the create function, or the create API includes storage requirement information of the processing apparatus; and the processor 41 is specifically configured to:

create a database instance according to the create request message, or the create function, or the create API; and interact with the storage apparatus according to the database instance and performance information of the storage apparatus, to determine the data distribution policy.

Further, the processor 41 is specifically configured to:

determine, according to the database instance and the performance information of the storage apparatus, a performance specification required to be allocated by the storage apparatus;

interact with the storage apparatus, to request the storage apparatus to allocate storage space meeting a requirement of the performance specification; and generate the data distribution policy, where the data distribution policy includes a correspondence between a keyword and a storage identifier, where the storage identifier is an identifier of an allocating storage network element or an identifier of a storage node in an allocating storage network element.

The data management network element in the foregoing embodiment may be used to implement the technical solution in the method embodiment shown in FIG. 3, and implementation principles and technical effects thereof are similar and are not described herein again.

Figure 13:
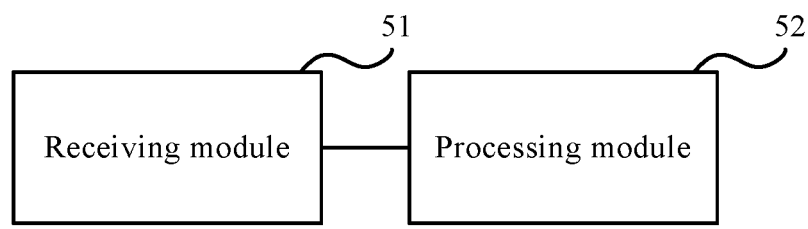
FIG. 13 is a schematic structural diagram of Embodiment 1 of a storage apparatus according to the present invention.

FIG. 13 is a schematic structural diagram of Embodiment 1 of a storage apparatus according to the present invention. As shown in FIG. 13, the apparatus in this embodiment may include:

a receiving module 51, configured to receive a context processing request sent by a processing apparatus; and a processing module 52, configured to perform processing on a context of a user equipment UE according to the context processing request.

The context processing request is a context storage request or a context acquiring request; the processing apparatus is a processing network element, or a processing node in a processing network element; the storage apparatus is a storage network element, or a storage node in a storage network element.

Further, the receiving module 51 is specifically configured to:

receive the context storage request sent by the processing apparatus, where the context storage request includes context information of the UE and identifier information of the UE; and the processing module 52 is specifically configured to:

determine, according to the identifier information of the UE, whether context information of the UE is stored; and if the context information of the UE is stored, perform update processing on the stored context information of the UE by using the context information of the UE included in the context storage request;

if the context information of the UE is not stored, save the context information of the UE included in the context storage request as a new record.

Further, the receiving module 51 is specifically configured to:

receive the context acquiring request sent by the processing apparatus, where the context acquiring request includes identifier information of the UE; and the processing module 52 is specifically configured to:

acquire context information of the UE by means of querying according to the identifier information of the UE; and send the context information of the UE acquired by means of querying to the processing apparatus.

Figure 14:
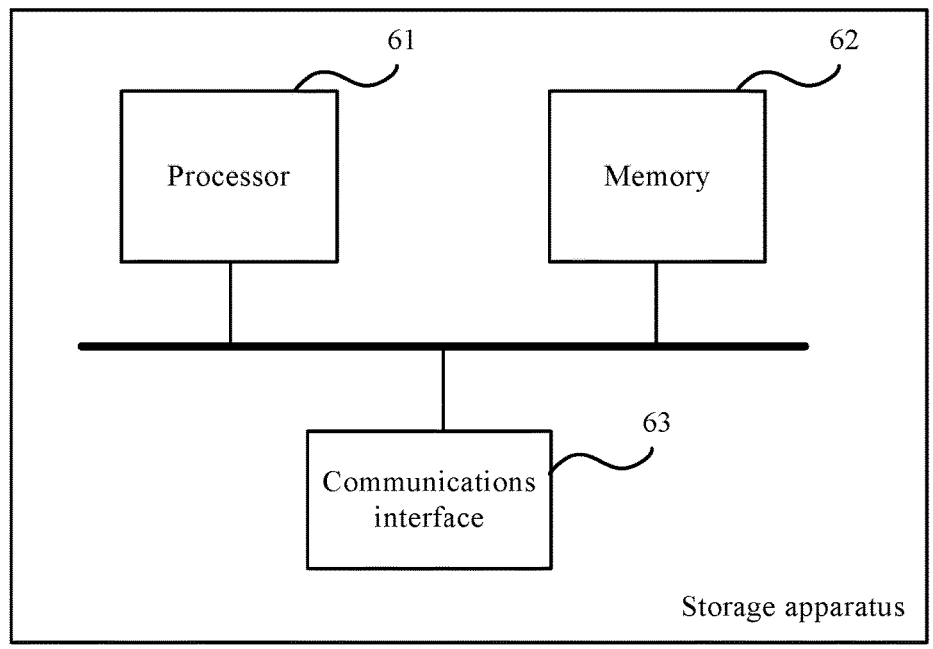
FIG. 14 is a schematic structural diagram of Embodiment 2 of a storage apparatus according to the present invention.

FIG. 14 is a schematic structural diagram of Embodiment 2 of a storage apparatus according to the present invention. As shown in FIG. 14, the storage apparatus in this embodiment may include: a processor 61, a memory 62, and at least one communications interface 63, where the communications interface 63 is configured to communicate with an external device, the memory 62 is configured to store a computer program instruction, and the processor 61 is configured to call the computer program instruction stored in the memory 62, so as to execute the following operations:

receiving a context processing request sent by a processing apparatus; and performing processing on a context of a user equipment UE according to the context processing request.

The context processing request is a context storage request or a context acquiring request; the processing apparatus is a processing network element, or a processing node in a processing network element; the storage apparatus is a storage network element, or a storage node in a storage network element.

Further, the processor 61 is specifically configured to:

receive the context storage request sent by the processing apparatus, where the context storage request includes context information of the UE and identifier information of the UE;

determine, according to the identifier information of the UE, whether context information of the UE is stored; and if the context information of the UE is stored, perform update processing on the stored context information of the UE by using the context information of the UE included in the context storage request;

if the context information of the UE is not stored, save the context information of the UE included in the context storage request as a new record.

Further, the processor 61 is specifically configured to:

receive the context acquiring request sent by the processing apparatus, where the context acquiring request includes identifier information of the UE;

acquire context information of the UE by means of querying according to the identifier information of the UE; and send the context information of the UE acquired by means of querying to the processing apparatus.

Further, the storage node is a storage process, a board, or storage space in the storage network element.

The storage apparatus in the foregoing embodiment may be used to implement the technical solution in the method embodiment shown in FIG. 4, and implementation principles and technical effects thereof are similar and are not described herein again.

Figure 15:
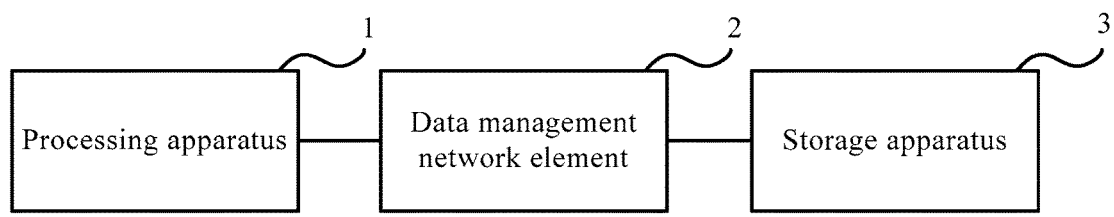
FIG. 15 is a schematic structural diagram of an embodiment of a communications system according to the present invention.

FIG. 15 is a schematic structural diagram of an embodiment of a communications system according to the present invention. As shown in FIG. 15, the communications system in this embodiment may include: a processing apparatus 1, a data management network element 2, and a storage apparatus 3. The processing apparatus 1 may use the structure shown in FIG. 9 or FIG. 10, and may be used to implement the technical solution in the method embodiment shown in FIG. 2; the data management network element 2 may use the structure shown in FIG. 11 or FIG. 12, and may be used to implement the technical solution in the method embodiment shown in FIG. 3; the storage apparatus 3 may use the structure shown in FIG. 13 or FIG. 14, and may be used to implement the technical solution in the method embodiment shown in FIG. 4.

For an implementable manner of an architecture of the communications system in this embodiment, reference may be made to the architecture shown in FIG. 5. For a specific process of interaction between the processing apparatus 1, the data management network element 2, and the storage apparatus 3 in the communications system, reference may be made to the interaction processes shown in FIG. 6 to FIG. 8.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication data processing method, comprising:
acquiring, by a processing apparatus, a data distribution policy, wherein the data distribution policy comprises storage information of a storage apparatus and a correspondence between a keyword and a storage identifier of the storage apparatus, wherein the storage apparatus is configured to store context information of a user equipment (UE);

determining, by the processing apparatus, a keyword corresponding to identifier information of the UE, and determining a storage identifier according to the determined keyword and the correspondence; and saving, by the processing apparatus, the context information of the UE into the storage apparatus according to the determined storage identifier, or acquiring the context information of the UE from the storage apparatus according to the determined storage identifier, wherein the storage apparatus is separated from the processing apparatus.

2. The method according to claim 1, wherein the acquiring, by a processing apparatus, a data distribution policy, wherein the data distribution policy comprises storage information of a storage apparatus, comprises:

sending, by the processing apparatus, a create request message to a data management network element, or calling, by the processing apparatus, a database instance create function of a data management network element, or calling, by the processing apparatus, a database instance create Application Programming Interface (API) of a data management network element, so that the data management network element interacts with the storage apparatus according to the create request message, the create function, or the create API, to determine the data distribution policy; and receiving, by the processing apparatus, the data distribution policy sent by the data management network element.

3. The method according to claim 2, wherein the create request message, the create function, or the create API comprises storage requirement information of the processing apparatus, so that the data management network element requests, according to the storage requirement information, the storage apparatus to allocate storage space.

4. The method according to claim 2, further comprising:

creating, by the data management network element, a database instance according to the create request message, or the create function, or the create API;

requesting, by the data management network element, the storage apparatus to allocate storage space; and creating, by the data management network element, the data distribution policy according to the created database instance and the storage apparatus that corresponds is corresponding to the database instance.

5. The method according to claim 1, wherein the determining, by the processing apparatus, a keyword corresponding to identifier information of the UE comprises:

performing, by the processing apparatus, hash operation on the identifier information of the UE, to obtain the keyword corresponding to the identifier information of the UE.

6. The method according to claim 1, wherein after the UE accesses a network, the method comprises:

acquiring, by the processing apparatus, the context information of the UE from the storage apparatus according to the data distribution policy, and saving the context information of the UE into the storage apparatus according to the data distribution policy.

7. The method according to claim 1, wherein after recovery from a fault, the method comprises:

acquiring, by the processing apparatus, the context information of the UE from the storage apparatus according to the data distribution policy.

8. The method according to claim 1, wherein the storage apparatus is a storage network element or a storage node in the storage network element.

9. A communication data processing method, comprising:

receiving, by a data management network element, a create request message sent by a processing apparatus, or receiving a database instance create function called by the processing apparatus, or receiving a database instance create Application Programming interface (API) called by the processing apparatus;

interacting, by the data management network element, with a storage apparatus according to the create request message, the create function, or the create API, to determine a data distribution policy, wherein the data distribution policy comprises storage information of the storage apparatus and a correspondence between a keyword and a storage identifier of the storage apparatus, wherein the storage apparatus is configured to store context information of a user equipment (UE); and sending, by the data management network element, the data distribution policy to the processing apparatus, wherein the processing apparatus determines a keyword corresponding to identifier information of the UE, determines a storage identifier according to the determined keyword and the correspondence, and saves the context information of the UE into the storage apparatus according to the determined storage identifier, or acquires the context information of the UE from the storage apparatus according to the determined storage identifier, wherein the storage apparatus is separated from the processing apparatus.

10. The method according to claim 9, wherein the create request message, the create function, or the create API comprises storage requirement information of the processing apparatus; and wherein the interacting, by the data management network element, with a storage apparatus according to the create request message, or the create function, the create API, to determine a data distribution policy comprises:

creating, by the data management network element, a database instance according to the create request message, the create function, or the create API; and interacting, by the data management network element, with the storage apparatus according to the database instance and performance information of the storage apparatus, to determine the data distribution policy.

11. The method according to claim 10, wherein the interacting, by the data management network element, with the storage apparatus according to the database instance and performance information of the storage apparatus, to determine the data distribution policy comprises:

determining, by the data management network element according to the database instance and the performance information of the storage apparatus, a performance specification required to be allocated by the storage apparatus;

interacting, by the data management network element, with the storage apparatus, to request the storage apparatus to allocate storage space meeting a requirement of the performance specification; and generating, by the data management network element, the data distribution policy.

12. A communication data processing method, comprising:

receiving, by a storage apparatus, a context processing request sent by a processing apparatus, wherein the storage apparatus is a storage network element or a storage node in a storage network element separated from the processing apparatus, and wherein the context processing request is a context storage request or a context acquiring request; and performing, by the storage apparatus, processing on a context of the UE according to the context processing request, including:
  if the context processing request is a context storage request, storing the context information of the UE, wherein the context storage request comprises context information of a user equipment (UE) and identifier information of the UE; and
  if the context processing request is a context acquiring request, acquiring the context information of the UE by querying according to the identifier information of the UE which corresponds to a keyword and a storage identifier of the storage apparatus determined by the process apparatus based on a data distribution policy; and sending the context information of the UE to the processing apparatus.

13. The method according to claim 12, wherein
the performing, by the storage apparatus, processing on a context of the UE according to the context processing request comprises:
  determining, by the storage apparatus according to the identifier information of the UE, whether the context information of the UE is stored; and
  if the context information of the UE is stored, performing update processing on the stored context information of the UE by using the context information of the UE comprised in the context storage request; or
  if the context information of the UE is not stored, saving the context information of the UE comprised in the context storage request as a new record.

14. A processing apparatus, comprising: a processor, a memory, and at least one communications interface, wherein the communications interface is configured to communicate with an external device, the memory is configured to store a computer program instruction, and the processor is configured to execute the computer program instruction stored in the memory, so as to execute the following operations:
  acquiring a data distribution policy, wherein the data distribution policy comprises storage information of a storage apparatus and a correspondence between a keyword and a storage identifier of the storage apparatus, wherein the storage apparatus is configured to store context information of a user equipment (UE);
  determining, by the processing apparatus, a keyword corresponding to identifier information of the UE, and determining a storage identifier according to the determined keyword and the correspondence; and
  saving, by the processing apparatus, the context information of the UE into the storage apparatus according to the determined storage identifier, or acquiring the context information of the UE from the storage apparatus according to the determined storage identifier, wherein the storage apparatus is separated from the processing apparatus.

15. The apparatus according to claim 14, wherein the processor is configured to:
  send a create request message to a data management network element, or call a database instance create function of a data management network element, or call a database instance create Application Programming Interface (API) of a data management network element, so that the data management network element interacts with the storage apparatus according to the create request message, the create function, or the create API, to determine the data distribution policy; and
  receive the data distribution policy sent by the data management network element.

16. The apparatus according to claim 15, wherein the create request message, the create function, or the create API comprises storage requirement information of the processing apparatus, so that the data management network element requests, according to the storage requirement information, the storage apparatus to allocate storage space.

17. The apparatus according to claim 15, wherein the data management network element interacting with the storage apparatus according to the create request message, the create function, or the create API, to determine the data distribution policy comprises:
  creating a database instance according to the create request message, or the create function, or the create API;
  requesting the storage apparatus to allocate storage space; and
  creating the data distribution policy according to the created database instance and the storage apparatus corresponds to the database instance.

18. A data management network element, comprising: a processor, a memory, and at least one communications interface, wherein the communications interface is configured to communicate with an external device, the memory is configured to store a computer program instruction, and the processor is configured to execute the computer program instruction stored in the memory, so as to execute the following operations:
  receiving a create request message sent by a processing apparatus, or receiving a database instance create function called by the processing apparatus, or receiving a database instance create Application Programming Interface (API) called by the processing apparatus;
  interacting with a storage apparatus according to the create request message, or the create function, or the create API, to determine a data distribution policy, wherein the data distribution policy comprises storage information of the storage apparatus and a correspondence between a keyword and a storage identifier of the storage apparatus, wherein the storage apparatus is configured to store context information of a user equipment (UE); and
  sending the data distribution policy to the processing apparatus, wherein the processing apparatus determines a keyword corresponding to identifier information of the UE, determines a storage identifier according to the determined keyword and the correspondence, and saves the context information of the UE into the storage apparatus according to the determined storage identifier, or acquires the context information of the UE from the storage apparatus according to the determined storage identifier, wherein the storage apparatus is separated from the processing apparatus.

19. A storage apparatus, comprising: a processor, a memory, and at least one communications interface, wherein the communications interface is configured to communicate with an external device, the memory is configured to store a computer program instruction, and the processor is configured to call the computer program instruction stored in the memory, so as to execute the following operations:
  receiving a context processing request sent by a processing apparatus, wherein the context processing request is a context storage request or a context acquiring request;

performing processing on a context of the UE according to the context processing request, including:
  if the context processing request is a context storage request, storing the context information of the UE, wherein the context storage request comprises context information of a user equipment (UE) and identifier information of the UE; and
  if the context processing request is a context storage request, acquiring the context information of the UE by querying according to the identifier information of the UE which corresponds to a keyword and a storage identifier of the storage apparatus determined by the process apparatus based on a data distribution policy; and sending, the context information of the UE to the processing apparatus.

* * * * *

UNITED STATES PATENT AND TRADEMARK OFFICE
CERTIFICATE OF CORRECTION

PATENT NO. : 10,149,333 B2  
APPLICATION NO. : 15/242133  
DATED : December 4, 2018  
INVENTOR(S) : Ming Jiang et al.

Page 1 of 1

It is certified that error appears in the above-identified patent and that said Letters Patent is hereby corrected as shown below:

In the Claims

Claim 4, Column 19, Line 44-45 "the storage apparatus that corresponds is corresponding to the database instance." should read -- the storage apparatus that corresponds to the database instance --.

Claim 9, Column 20, Line 6 "Application Programming interface" should read -- Application Programming Interface --.

Signed and Sealed this  
Third Day of September, 2019

Andrei Iancu  
*Director of the United States Patent and Trademark Office*